United States Patent [19]
Wong et al.

[11] Patent Number: 5,208,796
[45] Date of Patent: May 4, 1993

[54] METHOD AND APPARATUS FOR TRANSVERSE IMAGE REGISTRATION ON PHOTORECEPTIVE BELTS

[75] Inventors: Lam F. Wong, Fairport; Stephen C. Arnone, Rochester; William J. Nowak; Daniel W. Costanza, both of Webster; Jacob N. Kluger, Rochester; Ssujan Hou, Webster; Lloyd W. Durfey, Palmyra, all of N.Y.

[73] Assignee: Xerox Corporation, Stamford, Conn.

[21] Appl. No.: 635,835

[22] Filed: Jan. 3, 1991

[51] Int. Cl.⁵ .................... G11B 7/00; G01N 21/86
[52] U.S. Cl. ...................... 369/97; 369/125; 250/548
[58] Field of Search .............. 358/406; 369/59, 93, 369/97, 112, 119, 120, 125; 346/93; 360/77.05, 77.01; 235/487, 494, 456; 250/548, 235, 236

[56] References Cited

U.S. PATENT DOCUMENTS

| | | | |
|---|---|---|---|
| 3,559,568 | 2/1971 | Stanley | 101/32 |
| 3,783,293 | 1/1974 | Gold et al. | 250/548 |
| 4,146,797 | 3/1979 | Nakagawa | 250/548 |
| 4,184,080 | 1/1980 | Massey | 250/548 |
| 4,266,123 | 5/1981 | Friberg | 250/205 |
| 4,321,700 | 3/1982 | Russell | 369/97 |
| 4,406,949 | 9/1983 | Spohnheimer | 250/548 |
| 4,429,985 | 2/1984 | Yokota | 250/548 |
| 4,588,882 | 5/1986 | Buxton | 369/97 |
| 4,641,070 | 2/1987 | Pfizenmaier et al. | 318/640 |
| 4,662,757 | 5/1987 | Duran, Jr. | 250/548 |
| 4,698,514 | 10/1987 | Hilmersson et al. | 250/566 |
| 4,728,800 | 3/1988 | Surka | 350/548 |
| 4,745,288 | 5/1988 | Hurley et al. | 250/548 |
| 4,827,140 | 5/1989 | Mohan | 280/548 |
| 4,857,745 | 8/1989 | Gough | 250/548 |
| 4,864,631 | 9/1989 | Jensen | 382/61 |
| 4,947,387 | 8/1990 | Hudson | 369/97 |
| 4,987,448 | 1/1991 | Chikama | 250/548 |
| 5,004,907 | 4/1991 | Shimizu et al. | 250/236 |
| 5,083,301 | 1/1992 | Matoba et al. | 369/124 |

FOREIGN PATENT DOCUMENTS 60-171906 9/1985 Japan .
63-31873 2/1988 Japan .

OTHER PUBLICATIONS

Minami et al., "Optical Scanner Design Leads to Commercial Laser Printer Success," Laser Focus/Electro-Optics, pp. 98, 100, 102, 104, and 106, Oct., 1987.

*Primary Examiner*—Wayne R. Young
*Assistant Examiner*—Nabil Hindi
*Attorney, Agent, or Firm*—Finnegan, Henderson, Farabow, Garrett & Dunner

[57] ABSTRACT

A method and apparatus for transverse registration of image exposures on photoreceptive belts subject to lateral deviation from linear travel in which targets, corresponding in location to the image areas to be exposed, are used for the detection of lateral belt displacement and to control the transverse location of exposure scan. The targets are of a pattern defining a reference line and a line inclined with respect to the direction of belt travel so that the duration of time between passage of the target lines with respect to a spacially fixed sensing axis will vary with lateral displacement of the belt. The targets may assume a variety of specific patterns and the invention is applicable to single and multi-pass image exposure systems as well as to both modulated laser and light emitting diode types of exposure devices.

23 Claims, 5 Drawing Sheets

METHOD AND APPARATUS FOR TRANSVERSE IMAGE REGISTRATION ON PHOTORECEPTIVE BELTS

BACKGROUND OF THE INVENTION

1. Field of the Invention

The present invention relates to registration of plural image exposures on a photoreceptive belt and, more particularly, to transverse registration of images formed by exposure to transverse line scanning on a longitudinally moving belt subject to lateral deviation from linear travel.

2. Description of the Related Art

In digital methods for providing color images by xerography, for example, each image area on a photoreceptive belt must make at least four passes relative to a transverse line scan by a modulated laser beam or a linear array of light emitting diodes and registered to within a 0.1 millimeter circle or within a tolerance of ±0.05 mm. The use of timing marks spaced longitudinally on the belt in correspondance with the image areas, coupled with available electronic sensors and associated circuitry, has enabled longitudinal registration of the image areas, or registration in the direction of belt travel, acceptably within this degree of precision. Registration of image elements or "pixels" in a transverse direction, or in a direction perpendicular to the direction of belt travel, has been more difficult to attain due to manufacturing tolerances in belt width, supporting roller geometry, uneven belt stretch or a combination of such tolerances.

In the past, the problems associated with transverse or cross registration of pixels in multiple exposures of images on photoreceptive belts have been addressed either by attempts to guide the belt in a manner to avoid or at least reduce lateral shifting, or by corrective steering of the belt in response to sensed lateral deviation from true linear travel. Physical guiding of the belt edges is limited in accuracy to the belt width variations or tolerances and is not acceptable for cross registration within the limits required for high quality xerographic color image reproduction, for example.

Belt steering techniques previously employed have most commonly relied on belt edge sensors to detect lateral shifting of the belt and to control a mechanical steering mechanism for returning it to the correct line of travel. Such belt steering systems are subject to inaccuracy resulting from belt width tolerances and on this basis alone, fall short of a full solution of the problem. The use of printed indicia in various continuous patterns along a longitudinal margin of the belt has also been proposed and, while avoiding the problems associated with belt width variations, are prone to diminished detector signal accuracy due to interference caused by dirt which may accumulate on the printed indicia, particularly in the environment of a xerographic apparatus. Another major drawback with steering mechanisms generally employed to control lateral shifting of belts is the need for a mechanical steering mechanism which requires a substantial measure of belt travel and time before the electrically sensed belt shifting can be accomplished.

These and other problems associated with accurate cross registration of images exposed on photoreceptive belts have demonstrated an acute need for improvement to accommodate the high degree of resolution attainable with state-of-the-art electronic scanning equipment.

SUMMARY OF THE INVENTION

An object of the present invention is the provision of an improved method for attaining transverse registration of an image exposure on a longitudinally traveling photoreceptive belt and by which the problems associated with lateral deviation from linear travel of such belts are substantially overcome. Another object of the present invention is the provision of a highly effective apparatus for implementing such a method.

Another object of the invention is to provide such a method and apparatus for assuring transverse registration of successive image exposures on such belts.

A further object of the invention is the provision of an improved method and apparatus for detecting lateral displacement of a longitudinally moving belt at spaced increments of the belt length.

A still further object of the invention is to provide a method and apparatus for detecting the lateral position of a photoreceptive belt in relation to an image area during a first and successive multiple exposures by a transverse scanning device and adjusting the effective scan location of that device so that the first and each successive images are in precise registration with each other.

Yet another object of the invention is the provision of such a method and apparatus which is adaptable to and includes diverse types of such transverse scanning devices and scanning procedures.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention achieves transverse registration of an image area to be exposed on a longitudinally moving photoreceptive belt which is subject to lateral deviation from linear travel by providing a target in fixed relation on the belt, detecting the lateral position of the target during movement of the belt, and adjusting the transverse location of the image area on the belt to compensate for the distance between the detected lateral position of the target and a spacially fixed reference point. As applied to transverse registration of multiple image exposures of a given image area on a photoreceptive belt by successive presentation of that image area to a transverse line scanning device, the lateral position of the target for the first of such multiple exposures is detected and stored, the lateral position of the same target is detected for each succeeding presentation of the image area to the scanning device and the scanning device is adjusted for each of the succeeding presentations as needed to account for deviation of the transverse position of the belt during each succeeding exposure.

The invention may be embodied in a multi-pass belt exposure system in which a given image area is presented successively to a single scanning device by multiple belt revolutions o in a single pass system in which an image area is presented successively to a plurality of longitudinally spaced scanning devices.

The target used for detection of transverse belt shifting is a pattern which defines an inclined line at an angle with respect to the direction of belt travel and at least one reference line so that target position in relation to a spacially fixed reference point, defined by a stationary sensor, may be determined as a function of the time interval required for travel of the target past the sensor. Preferably, the target is defined by apertures or transparent windows in the belt and the aforementioned lines of the target pattern established by edges of such apertures or windows. Where the reference line of the target pattern is perpendicular to the direction of belt travel, it may also be employed as a timing mark to indicate the longitudinal position of the target on the belt.

Also, the invention is adapted for use with laser and light emitting diode types of raster output scanners. Where the scanner employs a modulated laser beam to define a transverse line of scan, lateral shifting of the image exposure, in response to detected target position, is effected electronically by starting and ending the active or modulated segment of each line scan at points corresponding to the detected position of the target. In the case of a linear array of light emitting diodes, a combination of electronically displacing the line of scan and physical shifting of the diode array is used. In such scanners, where the electronic control is restricted to an increment of length corresponding to the diameter of a given light emitting diode, a course image shift is effected by electronically shifting between the respective LEDs to start and end the transverse scan line in a manner similar to that described with respect to a laser. Fine shifting of the LED array, however, is effected by physical shifting of the array using a electro-mechanical device such as a piezoelectric stack, or other forms of linear electronically controlled drive devices.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
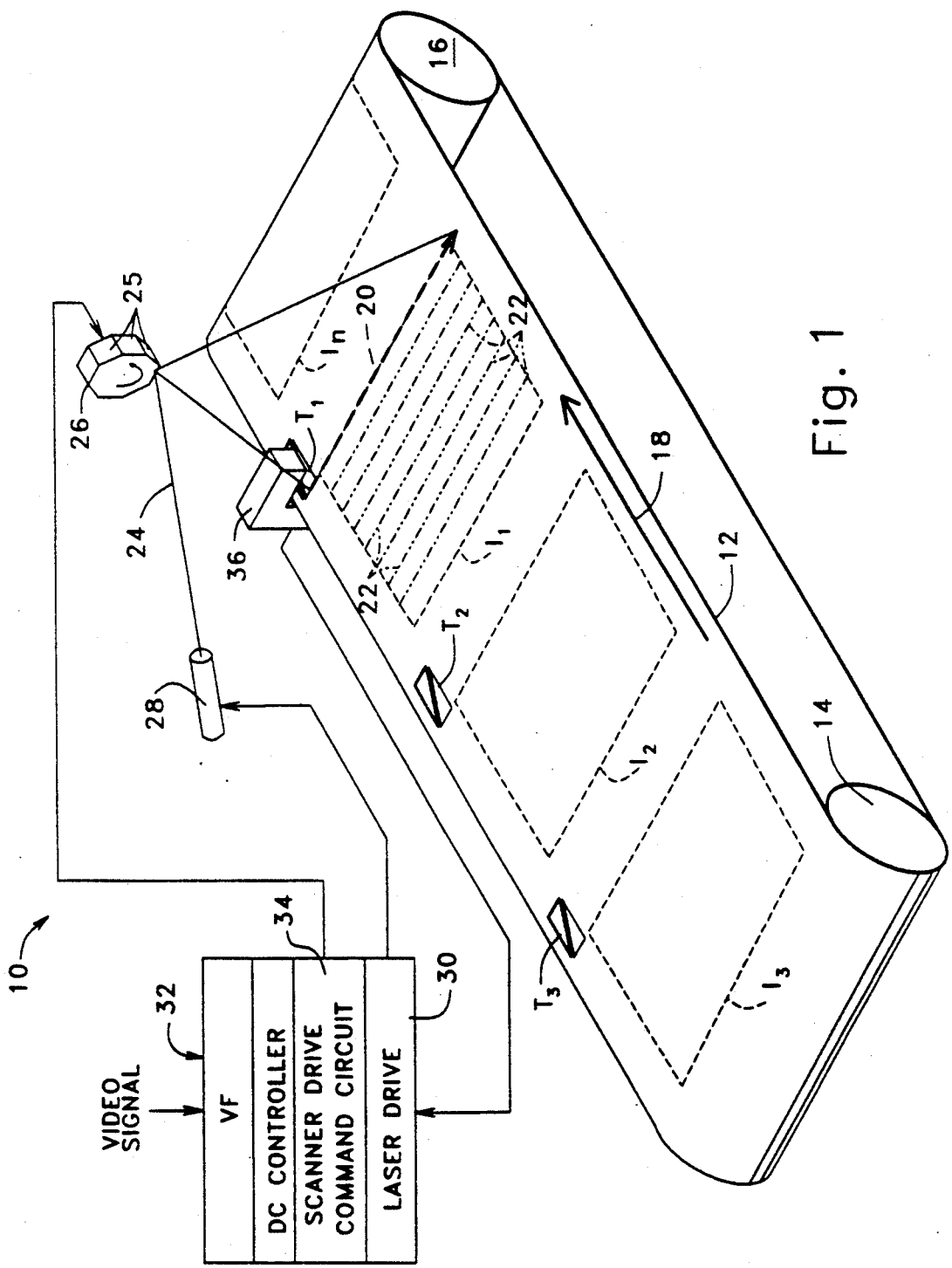
FIG. 1 is a largely schematic perspective view illustrating a system incorporating the invention and for providing multiple exposures on a photoreceptive belt by multiple passes of image areas on the belt in relation to a single raster output scanner.

Reference will now be made in detail to exemplary embodiments of the invention illustrated in the accompanying drawings. Wherever possible, the same reference characters will be used throughout the drawings to refer to the same or like parts.

In FIG. 1 of the drawings, an embodiment of the present invention is incorporated in a multi-pass xerographic printing system depicted schematically and designated generally by reference numeral 10. The system 10 includes a photoreceptive belt trained about guide rollers 14 and 16, at least one of which is driven to advance the belt 12 in a longitudinal direction of processing travel depicted by the arrow 18. The length of the belt 12 is designed to accept an integral number of spaced image areas $I_1$-$I_n$ represented by dashed line rectangles in FIG. 1. As each of the image areas $I_1$-$I_n$ reaches a transverse line of scan, represented by a dashed arrow 20, it is progressively exposed on closely spaced transverse raster lines 22 shown with exaggerated longitudinal spacing on the image area $I_1$ in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26. The beam 24 is emitted by a laser device 28 such as a laser diode, operated by a laser drive module 30 forming part of a control processor generally designated by the reference numeral 32. The processor 32 includes other circuit or logic modules indicated by legends in FIG. 1 and includes a scanner drive command circuit 34 by which operation of a motor (not shown) for rotating the polygon mirror 26 is controlled.

In the operation of the system 10, as thus far described, the processor 32 responds to a video signal to expose each raster line 22 to a linear segment of the video signal image. In xerographic color systems, each image area $I_1$-$I_n$ must be exposed in the same manner to four successive exposures, one for each of the three basic colors and black. In a multi-pass system such as the system 10, where only one raster output scanner or head is used, complete exposure of each image area requires four revolutions of the belt 12.

Figure 2:
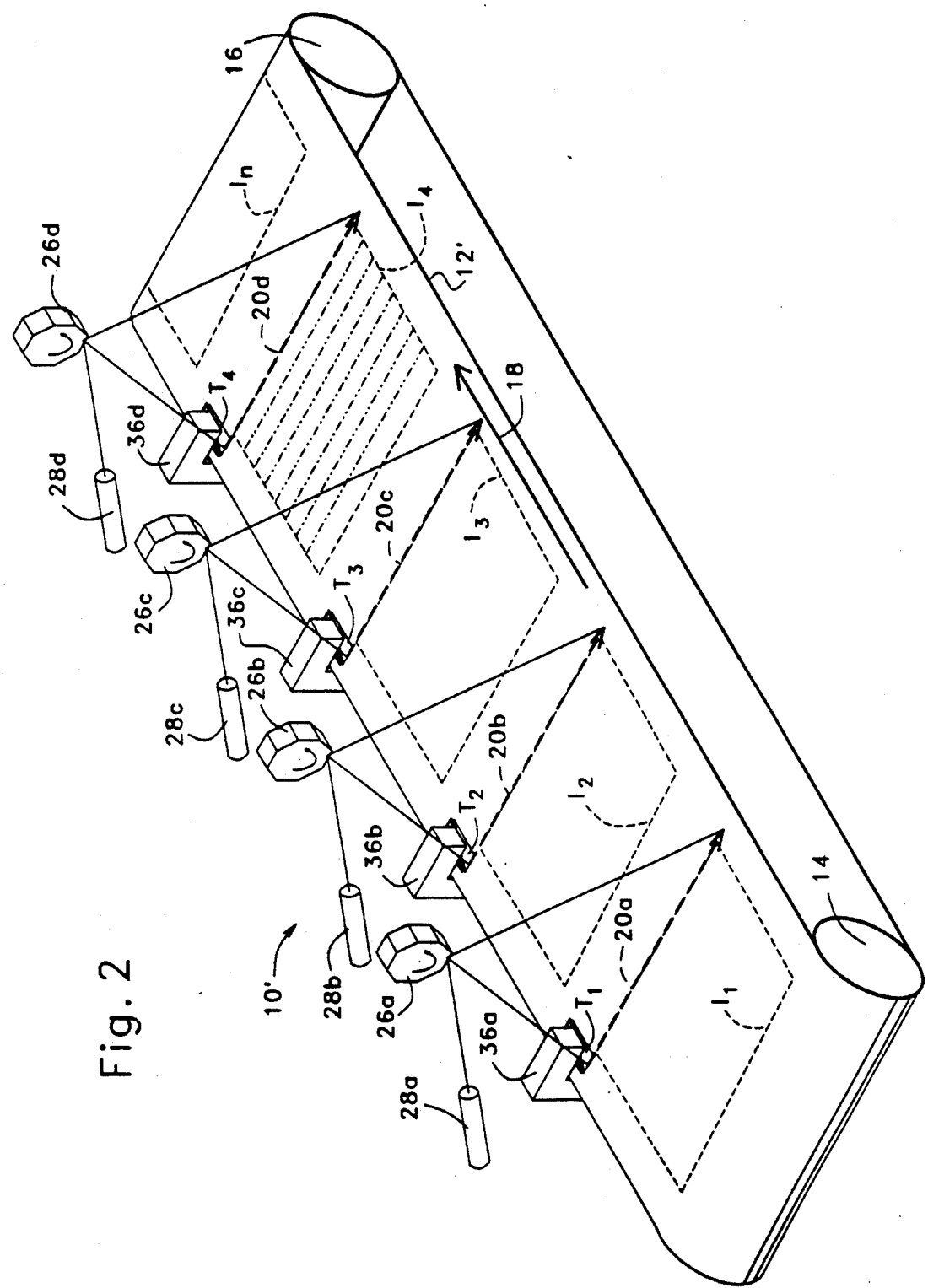
FIG. 2 is a perspective view similar to FIG. 1 but illustrating the invention in a system by which multiple exposures of an image area on a photoreceptive belt are made by a single pass of several raster output scanners.

In FIG. 2 of the drawings, a single pass system 10, is depicted in which each of several image areas $I_1$-$I_n$ are exposed successively by four raster output scanners each including its own polygon mirror 26a-26d and laser device 28a-28d. Although the transverse scan lines 20a-20d of the respective raster output scanners shown in FIG. 2 are spaced to be the same as the image area $I_1$-$I_4$, precise spacing of the raster output scanners in this fashion is not critical. Because of the need for charging and developing the image exposed by each raster output scanner, however, a substantial spacing between the scanners in the longitudinal direction of the belt is required.

A comparison of the multi-pass system of FIG. 1 with the single pass system of FIG. 2 will reveal that there is little difference in the manner by which each image area is successively subjected to multiple image exposures. In both systems, the image areas $I_1-I_n$ are successively exposed on successive raster lines 22 as each raster line registers with a transverse scan line 20 as a result of longitudinal movement of the belts 12 and 12'. Although the distance of belt travel between successive scans would appear considerably less in the single pass system 10' of FIG. 2 than it is with the system 10 in FIG. 1 as the belts are illustrated in these figures, in practice, the belt 12 of FIG. 1 could be shortened to the length needed to accommodate one or two image areas so that the distance of belt travel between successive scans approaches that of the single pass system 10'.

It is to be noted that the length of the transverse scan line 20 or transverse scan lines 20a-20d, in the respective systems 10 and 10', is longer than the transverse dimension of the image areas I. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module 30. Thus, the active portion of each transverse scan line may be shifted in a transverse direction by control of the laser drive module 30 and the transverse position of the exposed raster lines 22, and image areas $I_1-I_n$ shifted in relation to the respective belts 12 and 12'.

Figure 4:
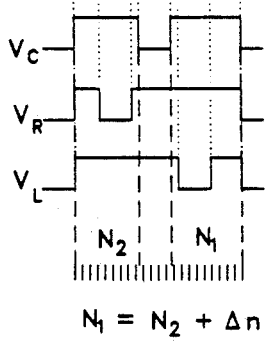
FIGS. 4-6 are illustrations of target pattern variations in accordance with the present invention together with respective voltage waveform signals provided by such patterns, and the manner by which said signals are converted to a measure of lateral displacement.
Figure 5:
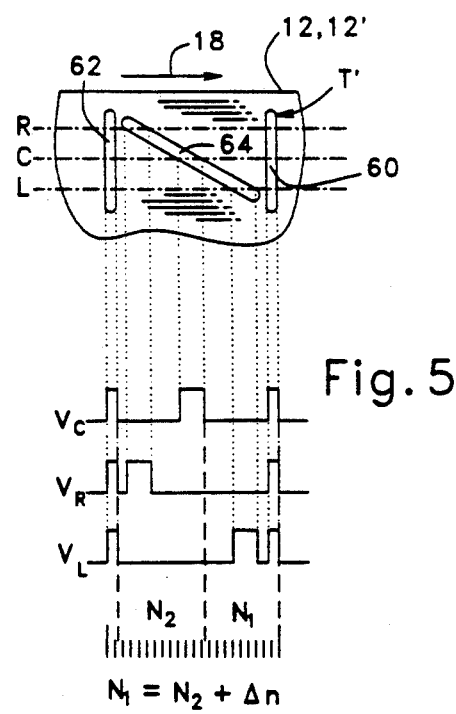
Figure 6:
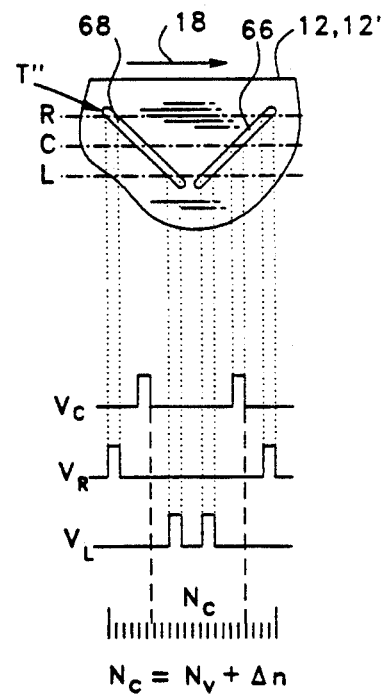

In accordance with the present invention, signals indicating deviation of belt travel from a straight line are developed and used to determine the precise transverse location of the first of successive image exposures in relation to the photoreceptive belt 12, 12' and to adjust the active portion of the transverse scan line 20 for each succeeding image as needed to assure precise longitudinal alignment or transverse registration of the succeeding images with the first image irrespective of the lateral position of the belt during exposure of the images. This operation is achieved in the illustrated embodiments and in substantial measure by the provision of targets aligned in the direction of belt travel and of a design to facilitate generation of a signal corresponding to the transverse location of each target. In particular and in the multi-pass system of FIG. 1, targets $T_1-T_n$, to be described in more detail below with reference to FIGS. 4–6, are located along a marginal edge of the belt 12 to be aligned in a longitudinal direction and are spaced to be located slightly ahead of each image area $I_1-I_n$ or upstream from each such area in the context of belt travel. A single sensor 36 is located to be aligned with targets $T_1-T_n$ for the image area passing the transverse scan line 20 in FIG. 1.

In the single pass system 10, of FIG. 2, the location of targets $T_1-T_n$ is the same as in FIG. 1, that is, one target for each image area. In this instance, however, a sensor 36a-36d is provided upstream from each transverse scan line 20a-20d, respectively.

Figure 3:
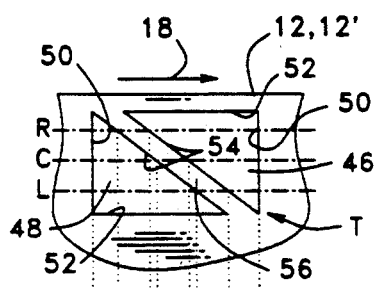
FIG. 3 is a partially cut-away perspective view illustrating a target sensor in accordance with the present invention.
Figure 3:
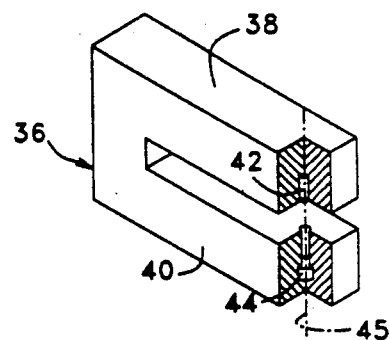

As shown in FIG. 3, the sensors 36 are each of a bifurcated or horseshoe configuration to establish upper and lower legs 38 and 40, respectively, adapted to be positioned about the marginal edge of the belts 12, 12' on which the targets $T_1-T_n$ are located without interference with longitudinal belt travel. The upper leg 38 of the sensor 36, in the illustrated embodiment, supports a light source, such as a light emitting diode 42, whereas the lower leg 40 supports a light detector such as a photodiode 44, conventionally included in circuitry (not shown) by which a voltage signal is developed in response to light detected by the photodiode 44. The diodes 42 and 44 are aligned on a common sensing axis 45.

In FIGS. 4–6, three variations of preferred target patterns T, T' and T'' are illustrated together with voltage signal wave forms developed by passage of each such target between the light emitting diode 42 and the photodiode 44 of each sensor 36 during longitudinal movement of the belt 12, 12' on which the targets are located. In each of the variations, the target is preferably defined by apertures cut or otherwise formed in the belt 12, 12' in a manner to provide at least two openings for unobstructed passage of light along the sensing axis 45 of a sensor 36, each such two openings having at least one angular edge for interrupting passage of light along a line inclined with respect to the direction of belt travel, represented in each of FIGS. 4–6 by an arrow 18, and at least one edge for establishing a timing frame of reference to relate the point of light interruption by the angular edge to longitudinal belt travel.

Also it will be noted that in each of FIGS. 4, 5 and 6, the targets T, T', and T'', are shown with three dash-dot lines R, C, and L, respectively. These lines represent the trace of the light beam passing between the light emitting diode 42 and the photodiode 44 on the sensing axis 45 of a sensor 36. The sensors 36 are spacially fixed, such as by mounting them to the supporting frame (not shown) of the belt rollers 14 and 16. The trace lines R, C, and L, therefore, correspond to extreme transverse deviations of the belt 12, 12' from true linear travel. Specifically, the sensing axis 45 will trace a line C on the target T, T', T'' when the belt 12, 12' is centered; a line R when the belt is shifted to the right in reference to its direction of travel; and a line L when the belt is shifted to the left in that frame of reference.

With reference now to FIG. 4 in which the target T is detailed, it will be seen that this variant of target is defined by a pair of apertures 46 and 48 of right-triangle configuration so that each aperture has a transverse edge 50, a longitudinal edge 52, and an inclined edge 54. The inclined edges 54 of the respective apertures are spaced to provide a diagonal strip 56 in the overall rectangular shape of the target T.

Also included as part of FIG. 4 are three voltage signals originated by the photodiode 44 of a sensor 36 after level sensing and squaring. The three signals are designated $V_C$, $V_R$, and $V_L$ and correspond directly to the voltage signals developed by the photodiode 44 when the target T is positioned in relation to the respective trace lines C, R and L. The voltage signals are used to control a clock pulse counter 58, depicted schematically in FIGS. 4–6, by a series of parallel lines representing clock pulse increments. In practice, the counter 58 is included as a component of the control processor 32 (FIG. 1).

Thus in FIG. 4, assuming that the target T is centered with respect to the sensing axis 45 of a given sensor 36, the sensing axis will lie on the trace line C during movement of the target T past that sensor. As the leading transverse edge 50 of the leading aperture 46 passes the sensing axis 45, a rising signal voltage at the photodiode 44 resets and starts the counter 58. The counter 58 will remain on to accumulate a total number of pulses $N_1$ until the sensing axis reaches the inclined edge 54 of the aperture 46. At this time, the photodiode signal voltage drops to turn off the counter 58 and the count $N_1$ is stored by the control processor 32. The counter is reset and started again when the inclined edge 54 of the trailing aperture 48 reaches the sensing axis 45 to raise the voltage signal and initiate a second clock pulse count $N_2$. The count $N_2$ will accumulate until the trailing transverse edge 50 of the aperture 46 reaches the sensing axis 45. The count $N_2$ is then stored and the deviation of the target from a transversely centered position with respect to the axis 45 is computed by the control processor 32 as the function $\Delta n$ in the equation $N_1 = N_2 + \Delta n$. Where the sensing axis 45 traverses the trace line C as depicted in FIG. 4, the count $N_1$ is equal to the count $N_2$ and $\Delta n$ equals 0.

From the foregoing, it will be seen that if the target T is other than centered on a sensing axis 45, the counts $N_1$ and $N_2$ will differ and the deviation factor $\Delta n$ will vary in magnitude with increasing deviation as well as in sign depending on which side of the center line trace C the target T is located. The voltage signal lines and $V_R$ and $V_L$ illustrate the extreme positions represented by the trace lines R and L in FIG. 4. Thus, where the trace line R is traversed by the sensing axis 45, $N_1$ will exceed $N_2$ and the sign of the deviation function $\Delta n$ will be positive. On the other hand, where the target is shifted so that the sensing axis 45 follows the trace line L, the count $N_1$ will be smaller than the count $N_2$ and the deviation factor $\Delta n$ will be a negative value. In this way, the deviation of the target T as well as the belt 12, 12' may be transmitted as an input to the processor 32 (FIG. 1).

The pattern of the target variant T' in FIG. 5 is similar to that of the target T in FIG. 4 except that in this instance, the combination of transverse and inclined edges in the target pattern are defined by elongated slots. In particular, a leading transverse slot 60 is spaced from a trailing transverse slot 62 by an inclined slot 64. In this variant the leading edge only of each slot may be used as a timing voltage signal for operating the counter 58. Specifically, upon intersecting the sensing axis 45, the leading edge of the leading slot 60 will develop a rising voltage signal to reset and start the counter 58. Correspondingly, a rising voltage signal at the leading edge of the inclined slot 64 may stop the counter with a total of $N_1$ clock pulses as well as then reset and initiate the counter until a rising voltage signal at the leading edge of the trailing slot 62 stops the counter with a total $N_2$ clock pulses. Calculation of the deviation factor $\Delta n$ in the variant of FIG. 5 is the same as that of FIG. 4.

Another feature common to the targets T and T, shown in FIGS. 4 and 5 is that any one of the transverse aperture edges (the edges 50 in FIG. 4 or the edges of the slots 60 and 62 in FIG. 5) of these target patterns may be used as a timing mark for longitudinal registration of successive image exposures in addition to providing the transverse deviation function $\Delta n$ as described. Such longitudinal registration is required to relate the longitudinal position of the moving belt to the location of a transverse scan line 20 or $20a$-$20d$ of the respective raster output scanners and is conventionally accomplished with photodetectable timing marks on the belt.

In FIG. 6, the target T'' is comprised of only two oppositely inclined slots 66 and 68. In this target variant, the deviation function $\Delta n$ is computed on the basis of variation from a constant clock pulse count $N_c$. Thus where the sensing axis 45 travels a line in the direction of the trace line R in FIG. 6, the clock pulse count value $N_v$ will increase relative to the constant clock pulse count $N_c$ and decrease as the sensing axis approaches the trace line L. The value $\Delta n$ will be positive or negative depending on whether $N_v$ is smaller or larger than $N_c$.

As explained above, the systems 10 and 10' operate to expose each image area $I_1$-$I_n$ to successive images, specifically four such images, either by multiple passes of each image area in relation to a single raster output scanner (FIG. 1) or by each image passing successive raster output scanners corresponding in number to the number of image exposures (FIG. 2). Each such image exposure is comprised of a transverse linear image segment on the respective raster lines 22 and, the successive image exposures must be precisely in registration, both longitudinally and transversely.

Figure 7A:
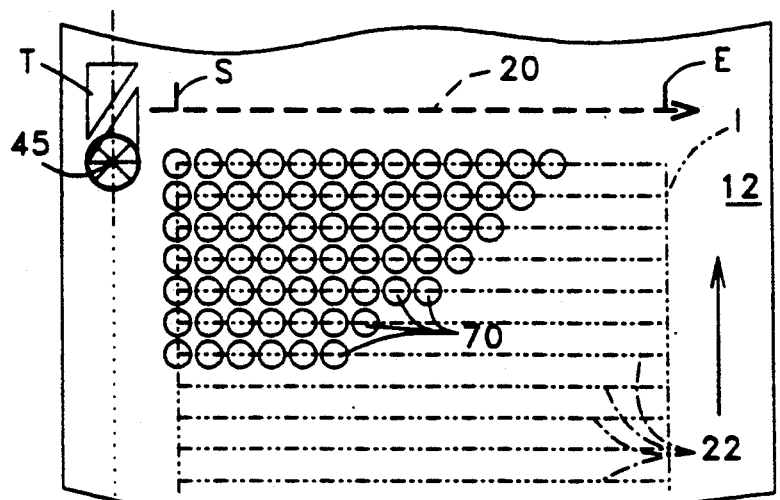
FIGS. 7a-7c are schematic views illustrating the successive exposure of an image area on a photoreceptive belt to multiple exposures, in accordance with the present invention.
Figure 7B:
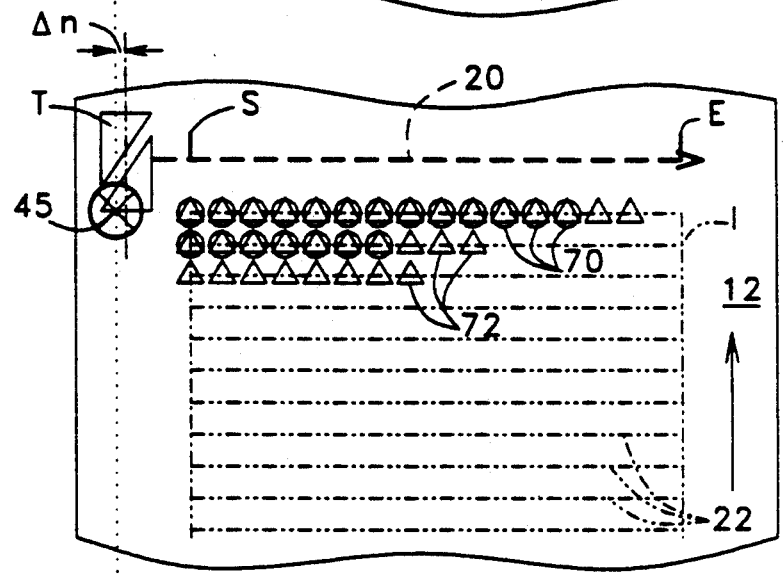
Figure 7C:
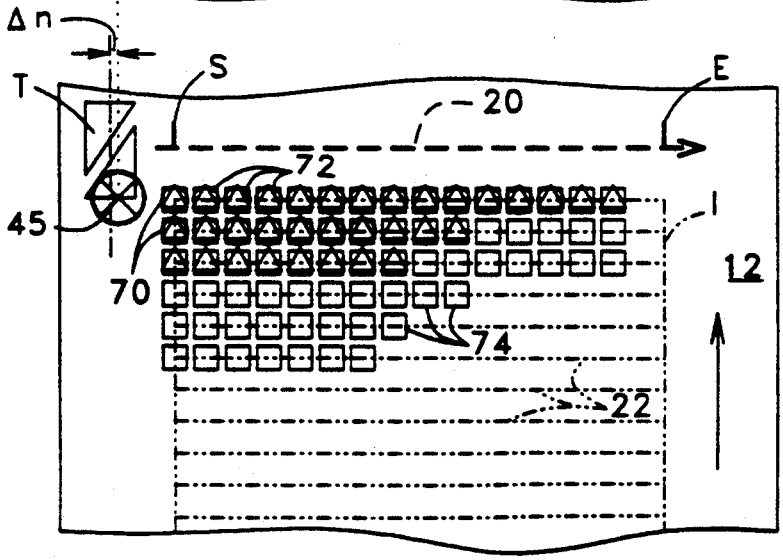

In FIGS. 7a-7c of the drawings, the orientation of a single image area I and an associated target T is shown relative to the scan line 20 of a raster output scanner and the sensing axis 45 of a sensor 36. Also depicted on an exaggerated scale in these figures are the respective picture elements or pixels illustrated as circles 70, triangles 72 and squares 74 corresponding respectively to the image elements to which the image area I is exposed during successive passes of the transverse scan line 20. To depict belt deviation from linear travel in FIGS. 7a-7c, the target T is displaced transversely in FIGS. 7b and 7c with respect to the sensor axis 45 which, being spacially fixed, remains aligned in all of these figures. The transverse displacement of the target T in FIGS. 7a-7c, therefore, represents deviation from linear belt travel normally experienced in a photoreceptive belt of a color xerography system, for example.

In operation and as the image area I makes its first pass by the scan line 20 to receive image pixels represented by the circles 70 in FIG. 7a, the target T will first pass the sensing axis 45 to discern the transverse position of the target and thus of the belt 12 and provide a signal corresponding to the deviation factor $\Delta n$ described with reference to FIGS. 4-6. This signal is stored and sent to the laser drive module 30 (FIG. 1) so that the active portion of each modulated laser beam scan on the line 20 starts at a predetermined point along the line or at the mark S in FIG. 7a and ends at another predetermined point represented by the mark E in FIG. 7a. The position of the starting and ending points S and E will in turn, determine the transverse location of the pixels 70 as the image area I passes the transverse scan line 20.

As the image area I makes its second pass of the line of scan 20 to receive a second array of image pixels represented by triangles 72 in FIG. 7b, the target T has shifted to the right of the position it occupied during the first pass of the image area I represented by FIG. 7a. As the target T passes the sensing axis 45, its transverse position is again detected and the resulting signal is compared with the stored value $\Delta n$ made during the first pass. As a result of the difference in transverse position, the position of the start and end points, S and E, of the active modulated laser beam along the transverse scan line 20 is shifted so that the transverse position of the second exposure is precisely aligned with the first exposure as represented by the triangles 72 superimposed on the circles 70 in FIG. 7b. The process is repeated for the third and any other subsequent pass depicted in FIG. 7c where the target T has been shifted to the left in terms of direction of belt travel so that the image pixels represented by squares 74 to which the image area I is exposed during this pass of the line 20 are precisely registered with the previously exposed pixels.

The modulated laser raster output scanners used in the systems 10 and 10' enable the attainment of transverse registration by electronically shifting the start and end of scan for each line of scan largely because of the high resolution in the trace of a modulated laser beam. In systems using a raster output scanner provided by a linear array of light emitting diodes (LED), however, resolution is limited physically by the space occupied by each LED in the scanner. Hence electronic shifting of the starting and ending points of an LED raster output scanner is restricted to increments of the LED diameter which, given the current state-of-the-art, is larger than the registration tolerance needed for quality multi-color image reproduction.

Figure 8:
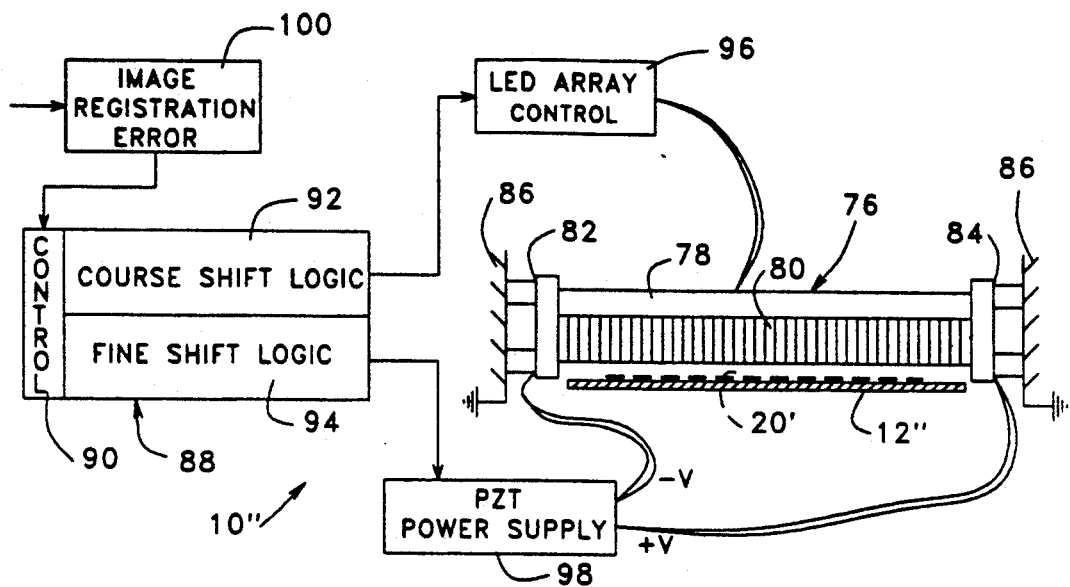
FIG. 8 is a schematic view illustrating an embodiment of the invention in which the raster output scanner is a linear array of light emitting diodes.
Figure 9:
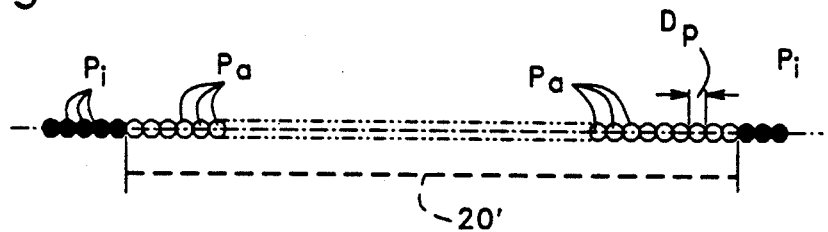
FIG. 9 is a schematic view illustrating operation of the LED array of FIG. 8 as a pattern of active and inactive pixels.
Figure 10:
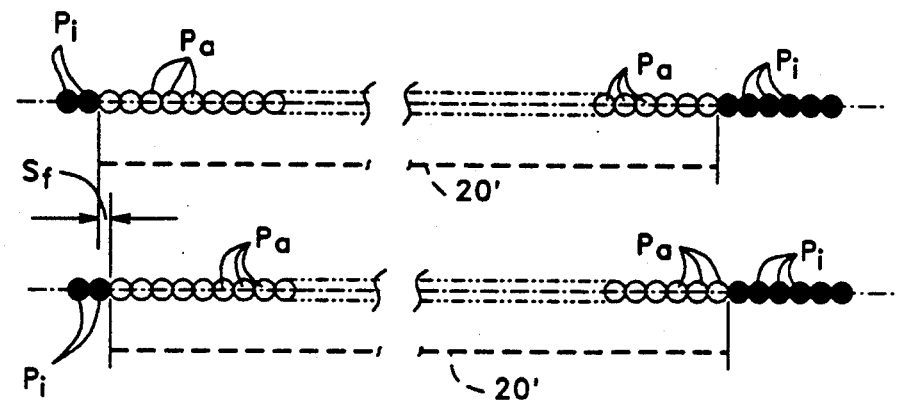
FIG. 10 is a view similar to FIG. 9 but schematically depicting the manner in which the scan line of the LED array of FIG. 8 is shifted.

In FIGS. 8-10 of the drawings, the invention is embodied in a system 10" shown to include an LED raster output scanner 76 positioned above a photoreceptive belt 12". The scanner 76 includes an LED array 78 and a selfoc lens group 80 by which image light is transmitted from the LED array 78 to a transverse scan line 20' on the belt 12". The LED array is supported at opposite ends by piezoelectric stacks 82 and 84 which extend to fixed supports 86.

The system 10" further includes a control processor 88 having a control module 90, a course shift logic module 92 and a fine shift logic module 94. The course shift logic module has an input to an LED array control unit 96 by which image information is supplied to the LED array 78. An image registration error processor 100 receives information originating with the signal voltage waveform developed by passage of the targets $T_1$-$T_n$ past the sensing axis 45 as described above with respect to FIGS. 4-6 of the drawings. As depicted in FIG. 8, the processed image registration error information is supplied to the control module of the control processor 88.

The manner in which the system 10" is operated to shift the active line scan of the raster output scanner 76 in response to image registration error may be understood by reference to FIGS. 9 and 10 of the drawings. As shown in FIG. 9, the length of the scanner 76 exceeds the length of the image transverse scan line 20' so that the exposure of any given raster line on the photoreceptive belt 12" will entail exposure illumination by less than the total number of LEDs in the array 78. This characteristic is represented in FIG. 9 by a transverse line of pixels in which exposed pixels are represented by white circles $P_a$ whereas inactive or non-exposed pixels are represented by black circles $P_i$. The diameter of each pixel is represented in FIG. 9 by the dimension $D_p$.

It will be appreciated from the illustration in FIG. 9 that the image transverse scan line 20, may be shifted to the right or to the left in increments corresponding to the pixel diameter $D_p$. This operation may be effected by operation of the LED array control 96 and in accordance with the present invention is so controlled by the course shift logic module of the processor 88 in response to an image registration error signal representing a required shift of that magnitude.

In addition to the increment of transverse shifting depicted in FIG. 9, and as shown in FIG. 10, a further or fine shifting of the transverse location of the image line of scan 20' may be effected by physically shifting the raster output scanner 76. A shift of this nature is represented in FIG. 10 by the dimension $S_f$ and in practice need not be any greater than the radius of the LED pixels or one half the dimension $D_p$. Such fine shifting is effected by operation of the piezoelectric stacks 82 and 84 under the control of the fine shift logic module 94 of the processor 88.

The provision of course and fine shifting of the line of scan 20' exemplified by the embodiment of FIGS. 8-10 is advantageous and preferred because it optimizes electronic control and hence the speed in which the scanner 76 may be adjusted in response to a detected lateral shifting of the belt 12" between successive image area exposures. Because the measure of physical shifting movement of the raster output scanner is limited to a portion of the pixel diameter $D_p$, however, a variety of physical drive devices may be substituted for the piezoelectric stacks 82 and 84 in the practice of the invention. For example, an electronically controlled stepper motor and a lead screw or cam may be used for the required physical shifting of the scanner 76. Also, a piezoelectric "inch worm" drive, in which linear motion is achieved by successive clamping, extending and unclamping of three separate driving piezoelectric cylinders about a driven cylindrical shaft connected to the scanner 76, may be used.

It will be apparent to those skilled in the art that various modifications and variations can be made in the method and apparatus of the present invention and in construction of the illustrated embodiments without departing from the scope or spirit of the invention. For example, the target patterns T, T' and T" of FIGS. 4-6 are preferably defined by apertures through the belt to enable detection by coaxially aligned light emitting and light detecting elements in the sensor 36. These aperture patterns may be defined as transparent windows in an otherwise opaque belt to enable use of the described sensor 36 or, in some instances, they may be defined by reflective indicia and detected by a sensor in which the light source and light detector components are oriented on one side of the belt. While reflective target patterns of this type are less desirable because of their susceptibility to loss in reflective efficiency due to dirt and the like, they nevertheless fall within the scope and spirit of the broader aspects of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transverse registration of an image area to be exposed on a longitudinally moving belt subject to lateral deviation from linear travel, said method comprising the steps of:

providing a target in a fixed position on the belt, wherein said target defines a pattern having an inclined line at an angle to the direction of belt travel and at least one reference line;

detecting the lateral position of said target during movement of the belt by measuring the time interval between travel of said lines past a spatially fixed point; and adjusting the transverse location of the image area on the belt to compensate for the distance between the detected lateral position of said target and the spatially fixed reference point.

2. The method recited in claim 1 wherein said reference line is perpendicular to the direction of belt travel.

3. The method recited in claim 2 including a leading reference line and a trailing reference line positioned respectively at opposite ends of said inclined line, said detecting step comprising measuring the time intervals between travel of said leading reference line and said inclined line past said spacially fixed reference point and between travel of said inclined line and said trailing reference line past said spacially fixed reference point and computing said lateral position as a function of the difference between said time intervals.

4. The method recited in claim 1 wherein said reference line is inclined at angle supplemental to the angle of said inclined line and wherein said detecting step comprises comparing the measured time interval with a constant time interval.

5. A method for transverse registration of multiple image exposures of an image area on a longitudinally moving belt subject to lateral deviation from linear travel, the exposures being made by successive presentation of the image area to a transverse line scanning means, said method comprising the steps of:
provoiding a target on the belt in a position relative to the image area;
detecting the lateral position of the target for a first of the image exposures;
detecting the lateral position of the target for each succeeding presentation of the image area to the transverse line scanning means; and
adjusting the transverse line scanning means for each said succeeding presentation as needed to assure transverse registration of said image exposures on said belt irrespective of the lateral position of the belt during each said presentation.

6. The method recited in claim 5 wherein the transverse line scanning means is operative in relation to a transverse line of scan on the belt, said line of scan having opposite end points of image exposure, said adjusting step comprising shifting the end points of said line of scan in accordance with the detected lateral position of said target.

7. The method recited in claim 6 comprising electronically shifting the end points of said line of scan.

8. The method recited in claim 6 comprising physically shifting the line scanning means to adjust the end points of said line of scan.

9. The method recited in claim 6 comprising electronically shifting the end points of said line of scan to effect a course increment of shift and physically shifting the line scanning means to attain a fine adjustment of the end points of said line of scan.

10. Apparatus for transverse registration of an image area to be exposed on a longitudinally moving belt subject to lateral deviation from linear travel, said apparatus comprising:
means for defining a target in a fixed position on the belt comprising a pattern of light apertures in said belt and establishing an inclined linear edge disposed at an angle to the direction of belt travel and a reference edge;
means for detecting the lateral position of said target in relation to a spatially fixed reference point during movement of the belt; and
means for adjusting the transverse location of the image area on the belt in relation to the detected lateral position of said target.

11. The apparatus recited in claim 11 wherein said pattern of apertures comprises a pair of apertures defining a leading transverse edge, a pair of spaced inclined edges and a trailing transverse edge.

12. The apparatus recited in claim 11 wherein each of said pair of apertures is of right triangular configuration.

13. The apparatus recited in claim 11 wherein said pattern of apertures comprises a transverse leading slot like aperture, an inclined slot like aperture, and a transverse trailing slot like aperture.

14. The apparatus recited in claim 10 wherein said pattern of apertures comprises a pair of oppositely inclined apertures converging at equal angles in a transverse direction.

15. The apparatus recited in any one of claims 11-14 in which said detecting means comprises illumination means, photodetector means and means for supporting said illumination means and said photodetector means on opposite sides of the belt and aligned on a common sensing axis.

16. The apparatus recited in any one of claim 11-14 wherein said detecting means comprises timing means for measuring the time of belt travel between said inclined edge and said reference edge and means for converting the measured time to a value of lateral displacement.

17. Apparatus for multiple image exposures of an image area on a longitudinally moving belt subject to lateral deviation from linear travel, said apparatus comprising:
transverse scanning means for exposing the image area;
means defining a target on the belt in a position relative to the image area;
means for detecting the lateral position of said target for each of the image exposures; and
means for adjusting said transverse scanning means for each of the image exposures in response to the detected lateral position of said target to assure transverse registration of said image exposures irrespective of the lateral position of the belt during each exposure.

18. The apparatus recited in claim 17 wherein said transverse scanning means comprises means for projecting an image line segment to a transverse line of scan on the belt, said means for adjusting said transverse scanning means comprising means for shifting the end points of said line of scan.

19. The apparatus recited in claim 18 wherein said means for projecting an image line segment comprises a modulated laser.

20. The apparatus recited in claim 18 wherein said means for projecting an image light comprises a linear array of light emitting diodes.

21. The apparatus recited in claim 20 wherein said means for adjusting said transverse scanning means comprises means for physically shifting said linear array of light emitting diodes.

22. The apparatus recited in claim 21 wherein said means for adjusting said transverse scanning means additionally comprises means for shifting the end points of said line of scan in increments corresponding to the lateral dimension of each light emitting diode in said linear array.

23. The apparatus recited in claim 22 wherein said in physical shifting of said linear array of light emitting diodes is effective for a portion of one of said increments of end point shifting.

* * * * *